United States Patent Office 2,880,236
Patented Mar. 31, 1959

2,880,236

PREPARATION OF STARCH-BISULPHITE ADDITION PRODUCTS

Charles L. Mehltretter, John W. Van Cleve, and Paul R. Watson, Peoria, Ill., assignors to the United States of America as represented by the Secretary of Agriculture No Drawing. Application November 20, 1956
Serial No. 623,507

2 Claims. (Cl. 260—513)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the preparation of new organic compounds and, more particularly, to the preparation of bisulphite addition compounds of dialdehyde starch.

As is well known in the field of carbohydrate chemistry, when starch is reacted with a periodate there is produced a compound which is generally termed dialdehyde starch or periodate-oxidized starch. The preparation of this compound is illustrated by the following equation

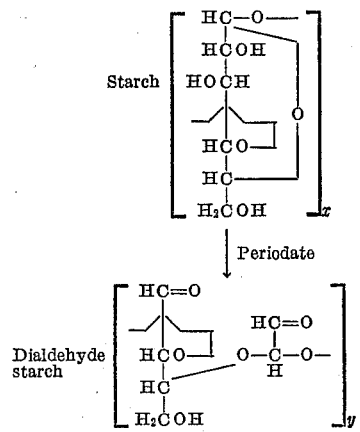

In the above formula $x$ and $y$ represent the number of repeating units in the starch and dialdehyde starch molecules, respectively. The terminal groups of the molecules each contain a hydrogen atom attached to the free terminal bond of the group. The value of $y$ may vary from as low as 10 to many thousands.

As is evident from the above equation, starch is a homopolymer of glucose,

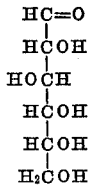

whereas dialdehyde starch is a heteropolymer of erythrose and glyoxal, the former being a 4-carbon atom polyhydric mono-aldehyde, the latter being a 2-carbon atom di-aldehyde. These structural units of dialdehyde starch have the formulas

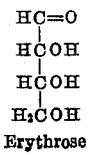 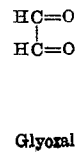

Erythrose  Glyoxal

One of the characteristics of dialdehyde starch is that it is essentially insoluble in water. For example, it cannot be dispersed in water to form pastes, as is possible with starch. If dialdehyde starch is heated with water, at best only a limited amount of material goes into solution and the resulting solution has little viscosity. On cooling, the dialdehyde settles out on the bottom of the solution. For these reasons dialdehyde starch has no usefulness in the preparation of pastes or in thickening applications.

We have found that bisulphite addition products of dialdehyde starch possess a substantial degree of water solubility and these addition products are therefore useful in many applications.

The production of the bisulphite addition products of the invention involves intimately contacting dialdehyde starch with an aqueous solution of sulphurous acid or a water-soluble bisulphite. It is most convenient to subject a mixture of dialdehyde starch and the solution of sulphurous acid (or bisulphite) to shaking or stirring for several hours at room temperature. It is not essential to conduct the reaction at room temperature, and temperatures from above the freezing point (0° C.) up to about 50° C. can be used. The reaction will proceed more rapidly at the higher temperatures so that it is generally preferred to conduct the reaction at about 40–50° C. The time of reaction will vary, depending particularly on the temperature and in any particular case the completion of the reaction can be determined by the fact that the product has maximum water solubility.

The proportions of dialdehyde starch and bisulphite or sulphurous acid used in the reaction may be varied, depending on the degree of modification of the dialdehyde starch which is desired. Generally, it is preferred that the products contain about from 0.5 to 1 bisulphite groups per carbonyl unit of dialdehyde starch. Where complete modification is desired, the bisulphite may be used in excess of the stoichiometrically required amount.

Generally, it is preferred to employ sulphurous acid, sodium bisulphite, or sodium metabisulphite to effectuate the reaction. However, one can employ any other water-soluble compound which yields bisulphite ions ($HSO_3^-$). Examples of additional reagents of this nature are potassium bisulphite, potassium metabisulphite, calcium bisulphite, magnesium bisulphite, and the like.

The reaction which occurs can be demonstrated by the following equation, as applied to the situation wherein complete addition is obtained.

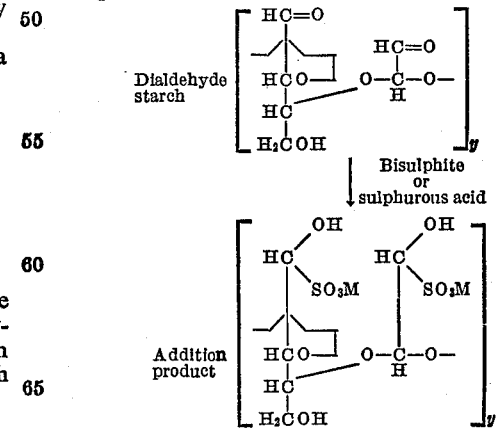

In the above equation, M represents a cation such as hydrogen, sodium, potassium, etc. Where the reagent is sulphurous acid M will be hydrogen; where the reagent is sodium bisulphite M will be sodium, and so forth. The symbol $y$ is as above defined.

In the equation above, there is illustrated the reaction wherein each repeating unit of dialdehyde starch has added two bisulphite radicals. Where a lesser degree of addition occurs, there may be only one bisulphite group per repeating unit, or the number of bisulphite groups in different repeating units may vary. Consequently, the products of the invention may be designated as chemically modified dialdehyde starches which contain units of the structure

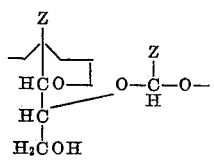

where one Z is the radical

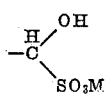

and the other Z is a radical of the group consisting of

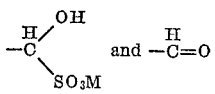

and wherein M is a cation. The products of the invention may also be defined as chemically modified dialdehyde starch, wherein aldehyde groups in the dialdehyde starch structure have been replaced by groups of the formula

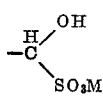

wherein M is a cation.

The aqueous solutions formed by reacting dialdehyde starch with the aqueous bisulphite (or sulphurous acid) may be employed directly as a sizing agent or thickener. Usually, it is preferred to obtain the material in the solid state. This can be done in several ways. For example, the solution of the product can simply be subjected to drying. In the alternative, the product can be precipitated by addition of alcohol to the aqueous solution of the product. This technique is suitable where the reagent used is sodium bisulphite, sodium metabisulphite, or other water-soluble bisulphite salt. Where a solution of sulphurous acid is employed, the product is not precipitated by addition of alcohol; the aqueous solution containing the product is miscible in all proportions with alcohol, the product imparting viscosity to the nearly clear alcohol solutions. In any event, the products of the invention in dry form are white solids which are stable on storage at room temperature.

The products of the invention have many useful applications. By dispersing the product in water there are formed relatively clear, viscid solutions which are useful for sizing paper, textiles, and cordage. The dispersions, or pastes as they may be termed, are also useful as adhesives for manufacture of paper bags, boxes, and the like. The products are also useful as thickening agents in textile printing pastes, in water paints, and the like.

The products of the invention can also be used for the preservation of ensilage. In the ensiling of fodder, the green forage material (corn, alfalfa, etc.) is packed into a bin and allowed to undergo lactic acid fermentation, the lactic acid acting to prevent spoilage of the material. Sodium metabisulphite is sometimes added to the green fodder to inhibit growth of stray organisms without interfering with the development of lactic-producing organisms. Sodium metabisulphite has the disadvantage that it is unstable and continuously evolves sulphur dioxide so that this agent is formed even at times when it is not actually needed or desired in the ensilage process. However, when the products of the invention are incorporated with the ensilage, they tend to release sulphur dioxide only when acidified through the development of lactic acid (or acetic acid) in the fermenting mass. Thus, the products of the invention have the advantage that they serve as agents for controlled evolution of sulphur dioxide and so efficiently assist in preserving the ensilage. In utilizing the products in this manner, they are incorporated in the green fodder in a proportion of about 14 pounds per ton of fodder and the ensiling process is otherwise carried out in the usual way.

We are aware that the general reaction of bisulphites with aldehydes is known. For example, it has been shown that bisulphite products can be prepared from glucose, glyoxal, etc. However, the bisulphite addition products of glucose and glyoxal do not contribute anything of note to the rheological properties of their solutions. In the case of dialdehyde starch, however, the disulphite reaction results in conversion of a water-insoluble polymer into one which is soluble in water by virtue of which fact it has many uses not possible with dialdehyde starch. In addition, the product made by reacting dialdehyde starch with sulphurous acid is soluble in aqueous alcohol, whereas in general aldehyde-bisulphite addition products are insoluble in such medium.

Since starch may be oxidized with periodate to form dialdehyde starches having slight to complete extents of oxidation, a wide range of dialdehyde starches is available for reaction in accordance with the process of the invention. We prefer to utilize dialdehyde starches of upwards of 37 percent oxidation for maximum viscosity and transparency of the aqueous solutions of their bisulphite addition products.

The invention is further demonstrated by the following illustrative examples:

*Example I*

Seventeen grams of dialdehyde starch (16 g. dry basis; 0.1 mole) was suspended in 70 ml. of water containing 19 grams (0.1 mole) of sodium metabisulphite. The dialdehyde starch had a degree of oxidation of 96 percent. The mixture was stirred and warmed to about 50° C. on the steam bath to a thick mass when 50 ml. more of water was added and the whole stirred to an oleaginous semitransparent mass. This mass was added to 250 ml. of methanol with stirring and the gummy product which separated allowed to solidify overnight. It was removed by filtration and resuspended in methanol by means of a blender, filtered, washed with methanol and dried at 40° C. and finally at 100° C.

Thirty-four grams of white dry product were isolated, which had the following analysis:

Calculated for $C_6H_8O_5$ $(NaHSO_3)_2 \cdot H_2O \cdot Na$, 11.9%; S, 16.5%. Found: Na, 11.4%; S, 15.4.

*Example II*

To a solution of 9.5 grams (0.05 mole) of sodium metabisulphite dissolved in 40 ml. of water was added 8.5 grams (0.05 mole) of dialdehyde starch (degree of oxidation 96%) with stirring and warming. The thick viscous mass that formed was dried at 40° C. under vacuum. The hard glossy translucent product weighed 21.4 grams. A small amount of the powdered product on warming in water produced a semitransparent viscous solution.

*Example III*

A solution of 12.4 grams of sodium metabisulphite in 100 ml. of water was prepared to which was added 10.1 g. of 95% dialdehyde starch (8 g. dry basis, degree of oxidation 95%). The mixture was shaken overnight at about 25–30° C. when an oleaginous nearly transparent mass was obtained.

Example IV

To 134 ml. of 6% sulphurous acid solution was added 10.1 g. of dialdehyde starch (degree of oxidation 95%) and the mixture shaken overnight at room temperature. A nearly transparent, very viscous solution was obtained which was soluble in all proportion in alcohol causing the alcohol to become viscous.

Example V 8.7 grams of dialdehyde starch (8 g. dry basis, degree of oxidation 37%) were added to 50 ml. of 6% sulphurous acid solution and on shaking overnight a translucent stiff gel was obtained. On dilution with water a viscous solution was obtained.

Example VI

The product of Example I was made up into a 5% paste in water. Cotton yarn was coated with this paste and dried. It was observed that the coating made the yarn stiffer and decreased its fuzziness so that the yarn was smooth and well suited for freely passing through eyes, shuttles, guides, and other mechanical devices as is encountered in spinning and similar textile operations.

Having thus described our invention, we claim:

1. A process for preparing water-soluble dialdehyde starch-bisulphite addition products which comprise intimately contacting dialdehyde starch with an aqueous solution of an inorganic compound yielding bisulphite ions.

2. The process of claim 1 wherein the inorganic compound is sodium bisulphite.

References Cited in the file of this patent

Ellington et al.: "Estimation of Carboxyl, Aldehyde, and Ketone Groups in Chromium Trioxide Oxystarches," Can. J. Chem., 31, 801–813 (1953).